(12) United States Patent
Ginesi et al.

(10) Patent No.: US 6,404,806 B1
(45) Date of Patent: Jun. 11, 2002

(54) METHOD AND APPARATUS FOR TIME-DOMAIN EQUALIZATION IN FDM-BASED DISCRETE MULTI-TONE MODEMS

(75) Inventors: Alberto Ginesi, Nepean; Christian Bourget, Hull; Michael John Wingrove, Kanata, all of (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/223,817

(22) Filed: Dec. 31, 1998

(51) Int. Cl.$^7$ .................................................. H04B 1/38
(52) U.S. Cl. ........................................................ 375/222
(58) Field of Search .................................. 375/222, 219, 375/260, 261, 341; 379/93.01, 27

(56) References Cited

U.S. PATENT DOCUMENTS 5,285,574 A * 2/1994 Chow et al. .................. 375/231
6,097,763 A * 8/2000 Djokovic et al. ............ 375/260

OTHER PUBLICATIONS

T1E1.4/92–174 "A DMT Proposal for ADSL Transceiver Interces". Aug. 20, 1992 J.M. Cioffi, J.T. Aslanis, J.A.C. Bingham and P.T. Tong.
"Adapted Optimization Criteriaon for FDM–based DMT–ADSL Equalization" Jean–Francois Van Kerckhove and Paul Spruyt 0–7803–3250–4/96, IEEE 1996 pp 1328–1334.

* cited by examiner

Primary Examiner—Chi Pham
Assistant Examiner—Khai Tran

(57) ABSTRACT

A time domain equalizer for a discrete multi-tone modem that includes an estimation of the contribution of out of band noise and echo to the overall channel impulse response. At start up the modem estimates out of band noise and echo. Using a minimum mean square error analysis, the time domain equalizer taps can be determined, taking into account the estimated out of band contribution. As a result, less complex duplexing filters, and time domain equalizer, are required.

25 Claims, 4 Drawing Sheets

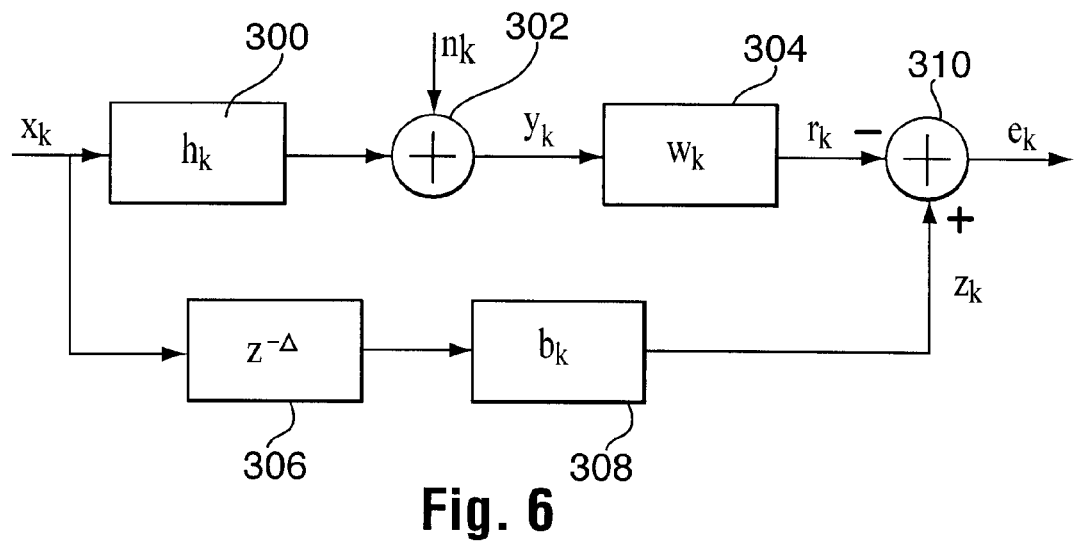
Fig. 6
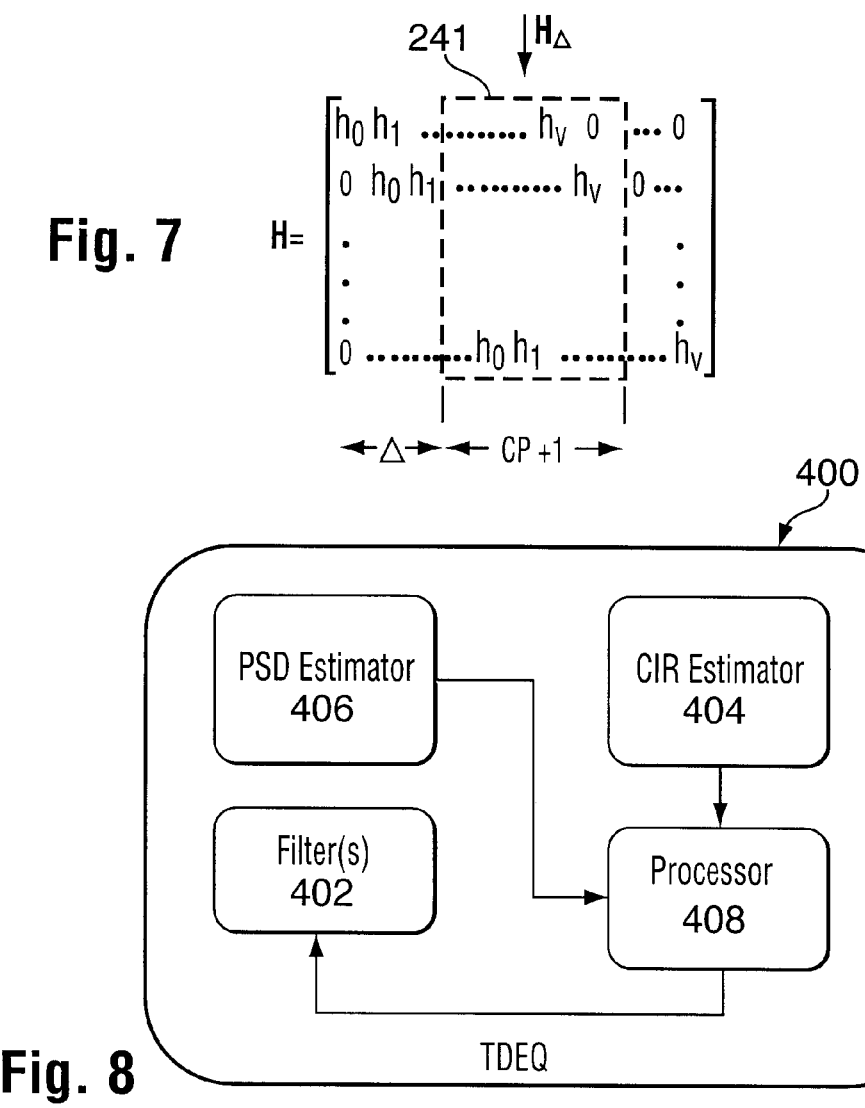
Fig. 7
Fig. 8

METHOD AND APPARATUS FOR TIME-DOMAIN EQUALIZATION IN FDM-BASED DISCRETE MULTI-TONE MODEMS

FIELD OF THE INVENTION

The present invention relates to a discrete multi-tone (DMT) modem. More particularly, the present invention relates to a method and apparatus for time-domain equalization in a frequency division multiplexing (FDM) based DMT modem to improve echo suppression, and reduce the effects of leakage of out of band frequency noise into in band signals.

BACKGROUND OF THE INVENTION

Much interest has been expressed recently in DMT modems to increase bandwidth with various communication schemes, especially those digital subscriber line schemes commonly referred to as xDSL systems, such as ADSL. For example, asymmetric digital subscriber line (ADSL) was conceived originally for video-on-demand type applications, but the focus is now on providing higher speed Internet services, such as the World Wide Web. The asymmetry in ADSL refers to the allocation of available bandwidth and means that it is faster (i.e.—has more allocated bandwidth) in the downstream (towards the subscriber) direction and slower in the upstream (towards a central office) direction. Some applications, such as browsing on the Internet, do not generally demand symmetric data rates and can take advantage of an asymmetric system.

ADSL converts existing twisted-pair copper telephone lines into access paths for multimedia and high-speed data communications. ADSL can transmit more than 6 megabits per sec (Mbps) (optionally up to 8 Mbps) to a downstream subscriber from a central office, and as much as 640 kilobits per second (kbps) (optionally up to 1 Mbps) upstream from a subscriber to the central office. Such rates expand existing access modem capacities by a factor of 50, or more, without new cabling.

ADSL was designed for residential or small-office, home-office type services and thus, it was designed from the outset to operate with the analog voice signals of Plain Old Telephone Service (POTS) simultaneously on the same line, such that an additional copper line is not needed. Generally, the POTS channel is split off from the digital modem by filters to provide uninterrupted POTS, even if the ADSL circuit fails.

Unlike previous copper line technologies, an ADSL system does not need manual pre-adjustment to accommodate line conditions. Instead, the ADSL modem automatically analyzes the line, as part of the process of establishing a connection, and adapts itself to start up the connection. This adaptation process can continue, once the connection is started, as the modem compensates for ongoing changes, such as those due to temperature or other environmental factors. Factors that can affect ADSL transmission include the data rate, the gauge thickness of the copper cable, the distance between the central office and the subscriber and the amount of interference present on the line.

To support bi-directional channels, ADSL modems allocate the available bandwidth by FDM, where non-overlapping bands are assigned for the downstream and upstream data. DMT, which has now been accepted by ANSI as the standard line code for ADSL transmission, divides an input data stream among several sub-channels, each sub-channel having the same amount of bandwidth but at different center frequencies. Sub-channels can have different bit rates, as discussed below. Using many sub-channels with very narrow bandwidths means the theoretical channel capacity, as calculated according to Shannon's law, can be approached. Generally, DMT was chosen because it is particularly well suited for transmission over copper line at the operating frequency bands. DMT also copes well with the typical noise and impulses that exist in the residential (subscriber) twisted-wire pair environment.

The sub-channels into which a channel is divided, commonly referred to as tones, are quadrature amplitude modulation (QAM) modulated on a separate carrier, commonly called a subcarrier, and the subcarrier frequencies are multiples of one basic frequency. The ANSI standard ADSL system has a theoretical maximum of 256 frequency sub-channels for the downstream data and 32 sub-channels for the upstream, though, in reality, line conditions, interference and other considerations reduce the actual available number of sub-channels. The frequency difference between two successive sub-channels is 4.3125 Khz. In a DSL-Lite or G.Lite system, the number of downstream data streams is halved, eliminating those at the higher frequencies.

As mentioned above, data to be transmitted is QAM modulated so that each sub-channel can transmit multiple bits and bit rates can vary between sub-channels. As the subscriber loops between the central office and a subscriber generally exhibit variations in gain and phase with frequency, each sub-channel can be arranged to carry a different number of bits appropriate for its frequency on the particular subscriber line. By assigning different numbers of bits to different sub-channels, each sub-channel can operate at an optimal, or near optimal, bit rate for the bandwidth available in the subscriber loop. Sub-channels at frequencies where the signal-to-noise ratio is low can have lower numbers of bits assigned to them, while sub-channels at frequencies with higher signal-to-noise ratios can have higher numbers of bits assigned to them, to keep the probability of a bit error constant across the subcarriers.

DMT modems are subject to a variety of noise sources that can cause undesirable interference. Gaussian, or white, noise is always present. Cross talks due to services on the loop, such as POTS or integrated services digital network (ISDN), or on other adjacent lines, can cause interference, especially in the upstream band. Echo due to the duplex nature of transmission in the DMT modem can also be a significant source of interference. Particularly in G.Lite DMT modems, an often unrecognized source of noise is caused by "out of band" interference, such as radio frequency interference (RFI) which can be converted into "in band" interference by the processing inherent to the receiver.

DMT modems contain advanced digital signal processing (DSP) systems to perform time domain to frequency domain conversions and to model the distortions caused by the noise and produce automatic corrections. Such models are implemented by various digital filters and, typically, the DMT modem includes filters to reduce echo and equalize frequency and time domain response, as well as various band pass filters. The performance of the DMT modem, particularly the usable bandwidth and achievable bit rate, is determined in large part by efficiency of these filters. However, there is always a trade-off between the optimum achievable performance and the relative complexity and cost, both in terms of components and processing time, of the digital filters.

It is therefore desired to have a DMT modem that can more efficiently model and implement digital filtering, particularly for the suppression of echo and out of band interference.

SUMMARY OF THE INVENTION

It is an object of the present invention to provide a novel method and apparatus for time domain equalization to suppress at least a portion of the line echo, and leakage from out of band frequencies in an FDM-based, DMT modem.

According to a first aspect of the present invention, there is provided a method for suppressing echo and out of band interference in a discrete multi-tone modem having a time domain equalizer, comprising the steps of:

(i) determining an estimated channel impulse response;

(ii) determining an estimated out of band noise power spectral density;

(iii) performing a statistical analysis of said estimated channel impulse response and said estimated out of band noise power spectral density;

(iv) applying a constraint to said analysis to determine a target impulse response; and (v) determining parameters for said time domain equalizer from said target impulse response.

In a further aspect, the present invention provides a discrete multi-tone modem comprising:

a channel impulse response estimator for estimating a channel impulse response;

an out of band noise power spectral density estimator for estimating an out of band noise power spectral density;

calculating means for performing a statistical analysis of said channel impulse response and said out of band noise power spectral density, constraining said analysis to determine a target impulse response; and determining time domain equalization parameters from said target impulse response; and a time domain equalizer having taps set to said determined parameters.

In yet a further aspect of the present invention, there is provided a time domain equalizer for a discrete multi-tone modem, comprising:

a channel impulse response estimator for estimating a channel impulse response;

an out of band noise power spectral density estimator for estimating an out of band noise power spectral density;

calculating means for performing a statistical analysis of said channel impulse response and said out of band noise power spectral density, constraining said analysis to determine a target impulse response; and determining time domain equalization parameters from said target impulse response; and at least one digital filter set to said determined parameters.

BRIEF DESCRIPTION OF THE DRAWINGS

Preferred embodiments of the present invention will now be described, by way of example only, with reference to the attached Figures, wherein:

FIG. 6 shows a model for calculating the minimum mean square error to determine the TDEQ taps;

FIG. 7 shows the extraction of a matrix $H_A$ from a matrix H; and

FIG. 8 shows an embodiment of a TDEQ according to the present invention.

DETAILED DESCRIPTION OF THE INVENTION

Figure 1:
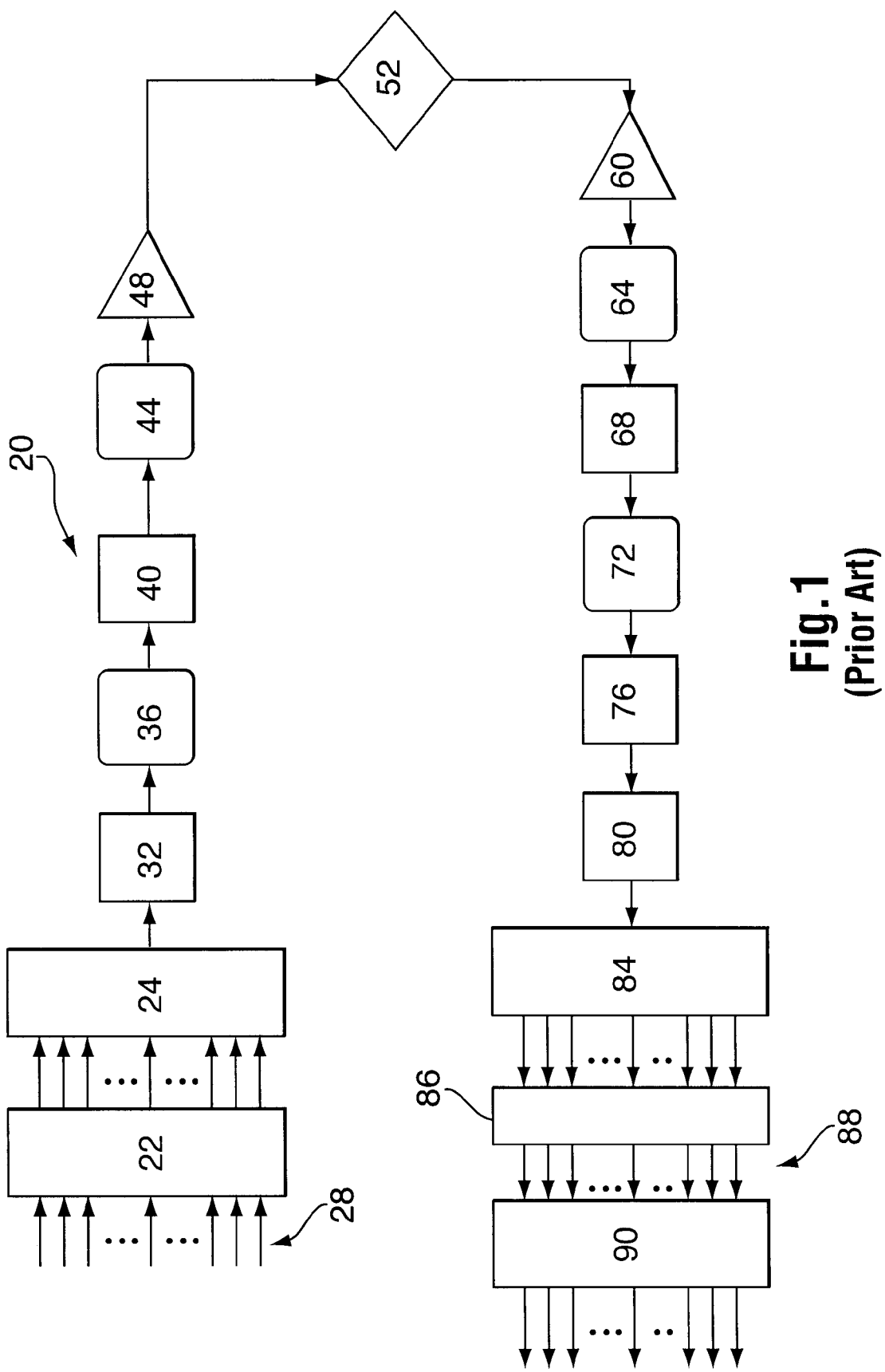
FIG. 1 shows a block diagram of a conventional DMT modem.

Before discussing the present invention in detail, a prior art DMT modem will be discussed with reference to FIG. 1. In FIG. 1, a prior art DMT modem is indicated generally, in block diagram form, at 20. The transmit side of modem 20 commences with a constellation encoder, at block 22, and a block 24 to perform an Inverse Fast Fourier Transform (IFFT) to convert input data into a digital time domain signal representing modulated subcarriers. Each subcarrier transmits a bit stream 28, although bit streams 28 can be different lengths for different subcarriers. The input to the IFFT module is a vector of QAM constellation points—N complex numbers, defining the amplitude and phase of each subcarrier encoded at block 22. IFFT creates a sum of the N subcarriers each modulated by its own phase and amplitude. Each subcarrier is then duplicated with its conjugate counterpart, to generate an IFFT output that is real only, holding 2N domain samples.

Figure 2:
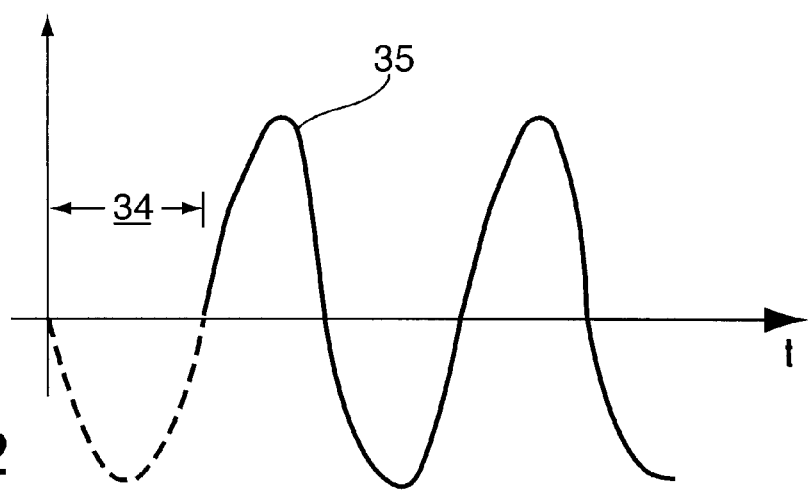
FIG. 2 shows a graphical representation of a typical subcarrier, with an added cyclic prefix.

The time domain signal output from the IFFT is next processed at block 32 to add a cyclic prefix (CP) 34. The addition of CP 34 to a single subcarrier 35 is shown in FIG. 2. The CP 34 separates the symbols in time in order to decrease intersymbol interference (ISI). As is well known, the signal going through the communication channel is linearly convolved with the impulse response of the channel. If the impulse response is shorter than the duration of the CP 34, each symbol can be processed separately, and ISI can be avoided. Also, the receiver views the incoming signal as if it has gone through a cyclic convolution. This ensures orthogonality between carriers.

Referring again to FIG. 1, the signal is then processed, at block 36, by a digital filter to suppress the side lobes of the signal and to ensure that the signal is within the spectral mask defined by relevant standards, etc. A digital to analog conversion is then performed at block 40 and, at block 44, the signal is filtered (smoothed) by an analog filter to further attenuate out-of-band signal components, including those resulting from the digital to analog conversion. Finally, the signal is boosted by a line driver 48 and is passed to a hybrid 52 for transmission through loop 56. As is well known, hybrid 52 separates the transmit side of modem 20 from the receive side.

The receive side of modem 20 includes an automatic gain control, in block 60, to boost signals received at hybrid 52 to defined levels. At block 64, an analog filter is employed to clean the received signal and, at block 68 an analog to digital conversion is performed. At block 72, digital filters filter the signal. To further shade the received side, block 76 comprises a time domain equalizer (TDEQ) which is employed to shorten the response of the communication channel. Generally, the TDEQ is a linear digital filter designed to condition the signal to minimize the ISI and interchannel interference (ICI). This is accomplished by shrinking the total impulse response of the channel to the length of CP+1, such that one symbol does not interfere with the next one.

The equalized signal is then processed, at block 80, to remove the CP 34, which was inserted at the transmitter, and the signal is passed to block 84 where a Fast Fourier Transform (FFT), complementary to the IFFT, is performed. The signal is then passed to a frequency domain equalizer (FDEQ), at block 86, to recover the transmitted QAM symbols from which the bit streams 88 which are recovered, buffered and reassembled into the transmitted information by the constellation decoder at block 90. DMT modems can also include a POTS splitter (not shown), which enables simultaneous access to voice telephony.

The present invention is generally directed to improvements in the TDEQ, at block 76, to include an estimation of, and compensate for, echo on the line and the ingress of out of band noise, particularly RFI, into the in band channels. Embodiments of the present invention will be with described with reference to FIGS. 3 through 8.

Figure 3:
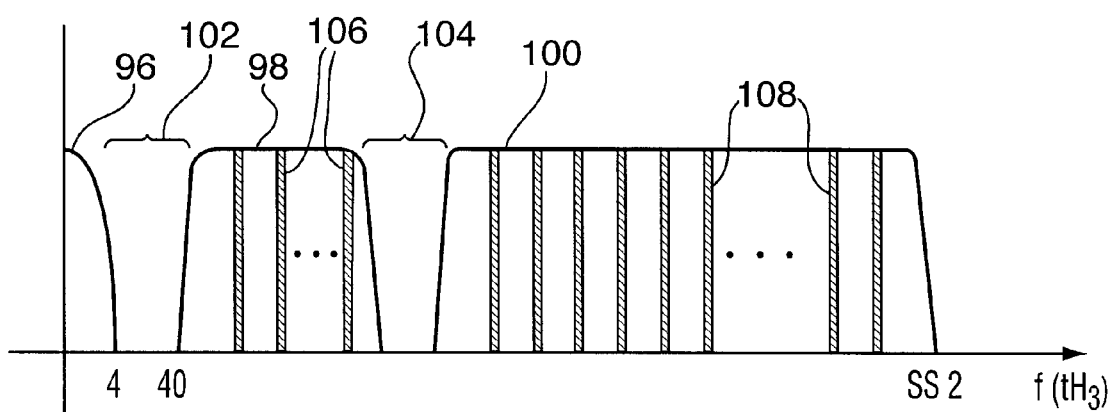
FIG. 3 shows a graphical representation of an ideal frequency spectrum for in a DMT modem.

To better understand the present invention, an ideal spectral distribution for a DSL-Lite, or G.Lite, DMT modem is shown in FIG. 3. Generally, the frequency spectrum is divided into three channels, a voice channel 96, an upstream channel 98 and a downstream channel 100. Voice channel 96 has a 4 kHz bandwidth, and carries conventional POTS. Upstream channel 98, which carries data from a subscriber to a central office, is separated from voice channel 96 by a band gap 102. Upstream and downstream channels 98, 100 are separated by a band gap 104.

Downstream channel 98 and upstream channel 100 are each divided into a number of sub-channels, or tones, 106 and 108, respectively. Sub-channels 106, 108 are each separated by 4.3125 kHz. Theoretically, the upstream channel 98 can contain thirty-two sub-channels 106, while the downstream channel can contain one hundred and twenty eight sub-channels 108. In reality, due to line conditions and guard band considerations, these numbers are somewhat reduced. Each tone 106, 108 carriers a modulated input data stream. Typically, input data streams are QAM modulated with a sub-carrier, corresponding to the center frequency of a sub-channel. Each sub-channel 106, 108 carries between 0 and 15 bits/symbol, depending on the line characteristics, such as signal-to-noise ratio (SNR), at its particular frequency.

Figure 4:
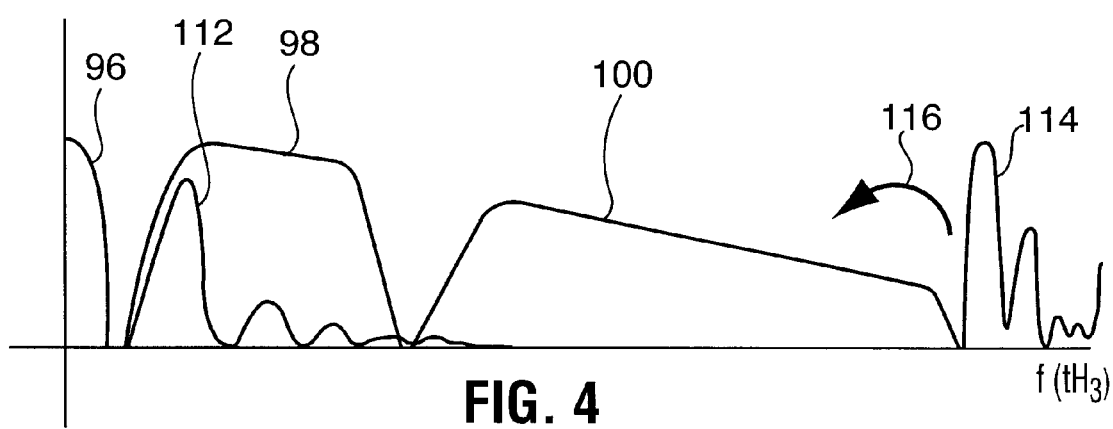
FIG. 4 shows a graphical representation of sources of noise in a DMT modem.

As discussed above, a DMT modem is subject to interference from various noise sources. As in any data transmission system, certain sources of noise are always present, such as additive white Gaussian noise due to thermal activity in the copper cable. Some of the sources of noise with which we are concerned are shown in FIG. 4. In FIG. 4, upstream and downstream channel 98 and 100 are shown attenuated. Attenuation of the channels 98 and 100 increases as the frequency increases, and is due to the line characteristics of copper cable. FIG. 4 is not to scale, and is provided for the purposes of illustration only. Sources of interference include cross talks 112, due to signals on other lines in the loop, such as HDSL and ISDN, and radio frequency interference (RFI) 114, particularly AM radio. In addition, due to the duplex nature of the DMT modem, echo, or self-next contribution, is present on the upstream and downstream channels 98, 100.

Even though RFI is outside downstream channel 100, due to the non-orthogonality of the IFFT/FFT, it can leak, or interfere, into the channel 100, as shown by arrow 116. RFI 114, primarily AM radio beginning at 540 kHz, is close to the upper limit of the DMT downstream channel 100. Because RFI 114 is so close to the upper limit of downstream channel 100, very steep filters are generally required to prevent RFI 114 from affecting modem performance. The non-orthogonal nature of the FFT can also cause leakage of echo between the upstream and downstream channels 98, 100, and also requires very steep and complex duplexing filters to effectively suppress its interference.

The complexity and steepness of the filters conventionally employed to suppress RFI 114 and echo leakage can be further compounded by the action of the TDEQ. As used herein, complexity refers to the number of components, and the amount of processing resources, both in terms of time and memory, required to implement a filter. The steepness refers to the bandwidth over which a filter must accomplish its conditioning of a signal. In order to shorten the channel impulse response, the TDEQ can synthesize a very high gain in the out of band area which can offset much of the echo suppression of the duplexing filters, and can itself boost back the echo and other out of band components, such as RFI 114.

To suppress the out of band signals that can thus "leak" into the in band, extremely complex, and steep, duplexing filters have generally been required. The complexity of the duplexing filters is further increased when the band gap between the upstream and downstream bands is kept narrow to maximize the spectral usage of the DMT modem.

To reduce both the complexity of the TDEQ and duplexing filters, the inventors of the present invention have developed a method for training the TDEQ to suppress out of band interference, such as echo and RFI. Training the TDEQ generally occurs at start up when a series of sequences are transmitted.

Figure 5:
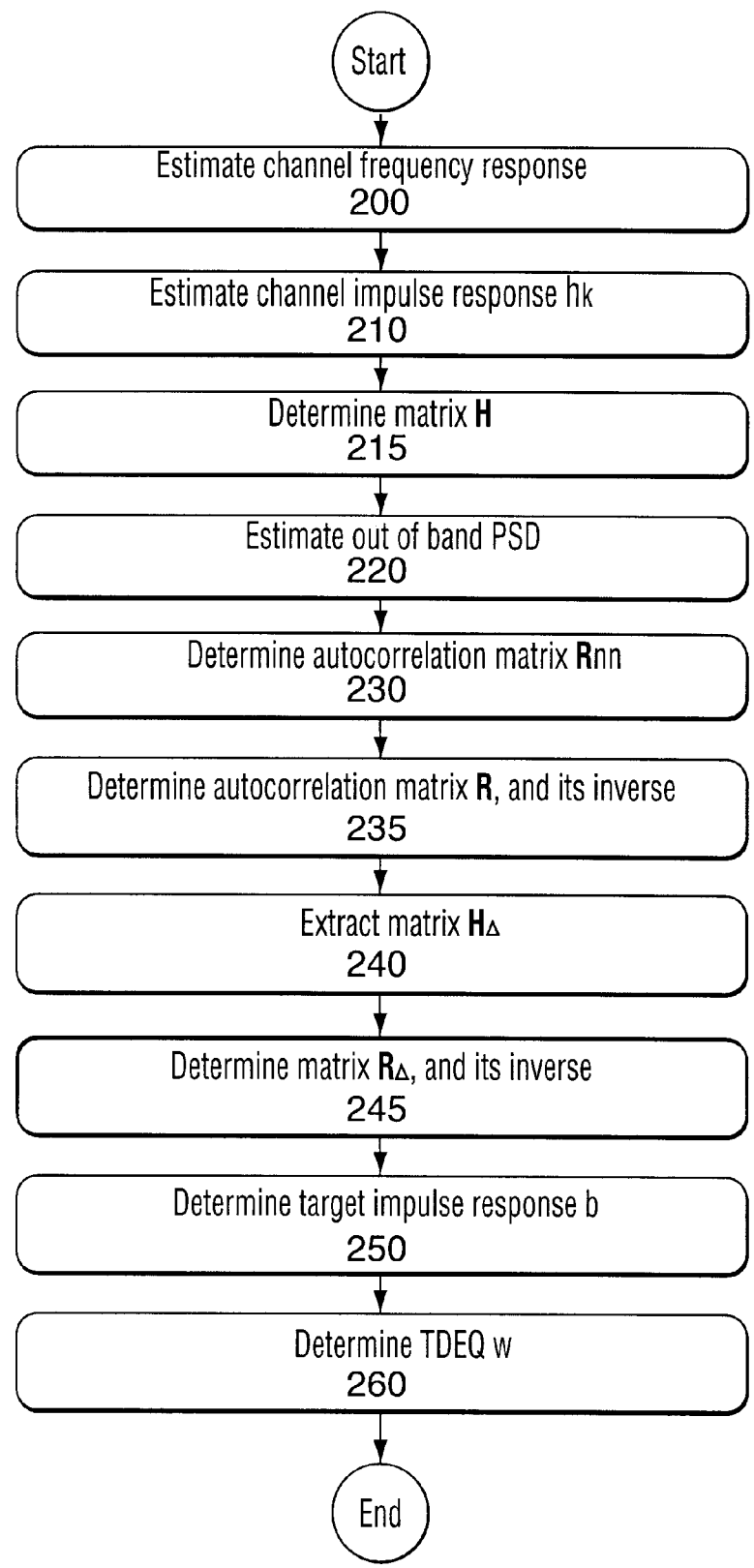
FIG. 5 shows a flow chart of a method for conditioning a DMT signal in a time domain equalizer in accordance with the present invention.

A presently preferred embodiment of the method of the present invention is generally illustrated in FIG. 5. The channel frequency response is estimated, at step 200, by transmitting a predetermined periodic signal, without a cyclic prefix to a far-end receiver. The receiver receives the signal and, without employing the TDEQ at block 76 or removing the CP at block 76, estimates the channel frequency response, both amplitude and phase, by dividing the output signal of the FFT at block 84 by the known transmitted signal. The accuracy of this estimate can be further improved by averaging over successive DMT symbols. An estimated channel impulse response (CIR) $h_k$ can then be determined, at step 210, by performing an IFFT on the estimated channel frequency response determined at step 200.

This estimated CIR $h_k$ includes the interference effects due to out of band noise, and can be analyzed, by appropriate modeling, to estimate the out of band noise. A presently preferred method involves building a matrix H, at step 215, from the estimated CIR $h_k$. Estimated CIR is a function with weights $h_k$, where k is an integer from 0 to v, and the length of the CIR is v+1. Variance, including shifts in frequency and phase, of the returned samples permit the channel impulse data, $h_0$ through $h_v$, determined at step 210, to be used to build a (M+v)×M matrix H of the overall channel impulse response, appropriately zero-padded;

$$H = \begin{bmatrix} h_0 & h_1 & \cdots & \cdots & \cdots & \cdots & h_v & 0 & \cdots & \cdots & 0 \\ 0 & h_0 & h_1 & \cdots & \cdots & \cdots & \cdots & h_v & 0 & \cdots & \cdots \\ \vdots & & & & & & & & & & \vdots \\ 0 & \cdots & \cdots & \cdots & h_0 & h_1 & \cdots & \cdots & \cdots & \cdots & h_v \end{bmatrix}$$

Next, an estimate of the out of band noise power spectral density (PSD) is determined at step 220. The out of band noise PSD is composed of self-next contributions from the near-end transmitter and external noise, such as RFI. To estimate the out of band PSD, the near-end transmitter sends a random signal with a PSD chosen to resemble the PSD of data to be transmitted during regular transmission, while the far-end transmitter sends no signal on the channel. The far-end receiver measures the variance of the output signal of the FFT at block 84, to estimate the out of band noise PSD. In a presently preferred embodiment, an out of band autocorrelation function is then determined by performing an IFFT on the estimated out of band noise PSD, and, as is well known in the art, a Toeplitz autocorrelation matrix $R_{an}$ can then be computed at step 230.

Alternatively, as described in J.-F. Van Kerckhove and P. Spruyt, "Adapted Optimization for FDM-based DMT-ADSL Equalization", Globecom-96, pp. 1328–1334, a mask of an expected worst case out of band noise autocorrelation matrix can be stored, rather than estimating the out of band noise PSD. As will be apparent to those of skill in the art, this alternative method does not take advantage of the line conditions actually available, and will generally result in poorer performance than estimating the autocorrelation matrix anew at each start up. For this reason, it is expected that this alternative will be restricted to low-end DMT modems, and to situations where the necessary data for estimating the PSD is not available.

The remaining steps of the method of the present invention will be more readily understood by reference to FIG. 6 in which a model for performing a statistical analysis of the noise contributions in a DMT modem, using a minimum mean square error method, as described in Al-Dhahir and J. Cioffi, "A Low Complexity Pole—Zero MMSE Equalizer for ML Receivers", "Proceeding of the 32$^{nd}$ Annual Allerton Conference on Communication, Control, and Computing", Sep. 28–30, 1994, pp 623–632, is shown. At block 300, a function represents the estimated CIR with weights $h_k$, where k is an integer from 0 to v, and the length of the CIR is v+1. The samples of the DMT signal supplied to the channel are represented by an input $x_k$. Additive noise $n_k$, such as white noise and other interference, is injected into the system at block 302, to produce samples $y_k$. Block 304 represents the unknown TDEQ function having M taps, where $w_k$ represents the TDEQ tap weights, with k being an integer from 0 to M−1. As is well understood by those of skill in the art, this upper chain can be matched to the lower chain which includes a delay function $z^{-\Delta}$ to which the samples $x_k$ are supplied at block 306, where $\Delta$ is the overall delay via the channel and the TDEQ. This delay function is followed by a target impulse response at block 308, having CP+1 taps with weights $b_k$. At block 310, the output $r_k$ of block 304 is subtracted from the output $z_k$ of block 308 to produce an $e_k$. The quality of the match is determined in terms of the power of the error $e_k$, or the mean square error (MSE). As is well known by those of skill in the art, the minimum mean square error (MMSE) method then seeks to determine a delay $\Delta$ and weights $b_k$ and $w_k$ to minimize the MSE.

Returning to FIG. 5, once H and $R_{nn}$ have been determined, an M×M symmetric Toeplitz autocorrelation matrix R can then be built and inverted, as specified in step 235, according to the equation:

$$R=HH^H+(1/P_x)R_{nn}$$

where Px is the known transmit signal power. The inverse of R, $R^{-1}$, is then determined using an iterative algorithm such as Levinson's method. Alternatively, Cholesky decomposition can be used. As will be understood by those of skill in the art, the advantage of the Levinson method is the associated reduction in complexity required to solve for $R^{-1}$. Generally, solving a set of M linear equations by, for example, Gaussian elimination requires $O(M^3)$ operations and $O(M^2)$ memory locations. Cholesky decomposition requires fewer computations, and less memory, but the are still in the order of $O(M^3)$ and $O(M^2)$, respectively. In contrast, Levinson's method requires only $O(M^2)$ operations and $O(M)$ memory locations.

Next, at step 240, for each value of $\Delta$, a matrix $H_\Delta$, having M rows and CP+1 columns, is extracted from H, as shown within the dashed box 241 in FIG. 6. $R_\Delta$ can then be determined at step 245 according to:

$$R_\Delta=P_x(I_{CP+1}-H_\Delta^H R^{-1} H_{66})$$

The inverse of $R_\Delta$, $R_\Delta^{-1}$, is also then calculated. Since $R_\Delta$ is a (CP+1)×(CP+1) positive definite matrix, it can be inverted by performing a Cholesky decomposition to reduce the matrix to a product of two triangular matrices: $R_\Delta=LL^T$. L and $L^T$ can then be inverted using the forward substitution method, and $R_\Delta^{-1}$ can be calculated as the product of $L^{-1}$ and $(L^T)^{-1}$. The number of operations required to calculate $R_\Delta^{-1}$ is in the range of $(CP+1)^3/3+(CP+1)^2$, and the memory locations is proportional to $(CP+1)^2$.

At step 250, the target impulse response (TIR) function shown at block 308 in FIG. 6, and represented by vector b, is calculated. Either of two constraints can be used to calculate b: a unit tap constraint (UTC) or a unit energy constraint (UEC). Generally, under the unit tap constraint an index parameter i, for $0 \leq i \leq p$, is defined that sets the i-th tap of the TIR to unity. The coefficients of b can then be calculated according to:

$$b=R_\Delta^{-1} ei/R_\Delta(i,i)$$

for each value of i.

Under the unit energy constraint, b is calculated as the eigenvector corresponding to the minimum eigenvalue of $R_\Delta$.

Having determined the target impulse response by either method, the TDEQ function can be determined, at step 260. The coefficients $w_k$ of the TDEQ function represented by vector w are calculated in accordance with:

$$w=b_H H^H_\Delta R^{-1}$$

The calculated coefficients $w_k$, which include an estimation of the out of band noise contribution are then used to set the TDEQ taps in the DMT modem of the present invention.

FIG. 7 shows a block diagram of a TDEQ 400 according to an embodiment of the present invention. In a DMT modem according to the present invention, TDEQ 400 generally replaces block 76 shown in FIG. 1. TDEQ 400 generally comprises one, or more, digital filters 402 that can suppress at least a portion of out of band noise. A channel impulse response estimator 404 receives a predetermined signal from which it can estimate the channel impulse response, and construct matrix H based on the variances in the signal, as described above. An out of band power spectral density estimator 406 receives a signal with a known PSD. Again, from variances in the received PSD, PSD estimator 406 can estimate the out of band nose PSD, as described above.

Calculating means, such as a microprocessor 408, is attached to both the CIR estimator 404 and PSD estimator 406. Processor 408 performs a statistical analysis, such as the MMSE method described above, constrains the analysis to determine the target impulse response, and determines TDEQ parameters, or taps, to include the out of band noise contributions, again as described in detail above. These parameters can then be employed to set the filter characteristics of the TDEQ filter(s) 402.

As will be apparent to those of skill in the art, the method and apparatus of the present invention permit an estimated contribution of out of band noise and echo to be included in the training of a TDEQ in a DMT modem. Including such out of band contributions has a number of advantages over the prior art. The duplexing filters conventionally provided to reject echo can be simpler in their design since at least a portion of the interference due to echo is filtered out by the TDEQ. Duplexing filters are not, therefore, required to be as steep nor as complex as in the prior art. The reduction in complexity of the duplexing filters can also reduce the complexity of the equalization for which the TDEQ is primarily designed. In particular, even though the present TDEQ includes filtering of the out of band noise and echo, it is not necessary to synthesize as high a gain in the band gap region, and thus the overall complexity of the TDEQ can be reduced and the formation of undesirable sidelobes can be suppressed. In addition, the contribution of out of band noise, particularly that due to RFI, which is not considered in conventional DMT modem implementations, is minimized by the TDEQ of the present invention.

The above-described embodiments of the invention are intended to be examples of the present invention and alterations and modifications may be effected thereto, by those of skill in the art, without departing from the scope of the invention which is defined solely by the claims appended hereto.

We claim:

1. A method for suppressing echo and out of band interference in a discrete multi-tone modem having a time domain equalizer, comprising the steps of:
   (i) determining an estimated channel impulse response;
   (ii) determining an estimated out of band noise power spectral density;
   (iii) performing a statistical analysis of said estimated channel impulse response and said estimated out of band noise power spectral density;
   (iv) applying a constraint to said analysis to determine a target impulse response; and
   (v) determining parameters for said time domain equalizer from said target impulse response.

2. A method according to claim 1, wherein step (i) includes receiving a predetermined periodic signal.

3. A method according to claim 2, wherein a matrix H of said channel impulse response is constructed from variances in said received periodic signal.

4. A method according to claim 3, wherein a matrix $H_\Delta$ is extracted from said matrix H, for determined delay values $\Delta$.

5. A method according to claim 1, wherein step (ii) includes receiving a signal with a known power spectral density.

6. A method according to claim 5, wherein an autocorrelation matrix is constructed from variances in said received power spectral density.

7. A method according to claim 1, wherein step (iii) comprises applying a minimum mean square error analysis.

8. A method according to claim 1, wherein said constraint is a unit tap constraint.

9. A method according to claim 1, wherein said constraint is a unit energy constraint.

10. A discrete multi-tone modem comprising:
    a channel impulse response estimator for estimating a channel impulse response;
    an out of band noise power spectral density estimator for estimating an out of band noise power spectral density;
    calculating means for performing a statistical analysis of said channel impulse response and said out of band noise power spectral density, constraining said analysis to determine a target impulse response; and determining time domain equalization parameters from said target impulse response; and
    a time domain equalizer having taps set to said determined parameters.

11. A discrete multi-tone modem according to claim 10, wherein said channel impulse estimator receives a predetermined periodic signal.

12. A discrete multi-tone modem according to claim 11, wherein said channel impulse estimator constructs a matrix H of said channel impulse response from variances in said received periodic signal.

13. A discrete multi-tone modem according to claim 10, wherein said out of band noise power spectral density estimator receives a signal with a known power spectral density.

14. A discrete multi-tone modem according to claim 13, wherein said out of band noise power spectral density estimator constructs an autocorrelation matrix from variances in said received power spectral density.

15. A discrete multi-tone modem according to claim 10, wherein said calculating means includes means to perform a minimum mean square error analysis.

16. A discrete multi-tone modem according to claim 10, wherein said calculating means employs a unit tap constraint to determine said target impulse response.

17. A discrete multi-tone modem according to claim 10, wherein said calculating means employs a unit energy constraint to determine said target impulse response.

18. A time domain equalizer for a discrete multi-tone modem, comprising:
    a channel impulse response estimator for estimating a channel impulse response;
    an out of band noise power spectral density estimator for estimating an out of band noise power spectral density;
    calculating means for performing a statistical analysis of said channel impulse response and said out of band noise power spectral density, constraining said analysis to determine a target impulse response; and determining time domain equalization parameters from said target impulse response; and
    at least one digital filter set to said determined parameters.

19. A time domain equalizer according to claim 18, wherein said channel impulse estimator receives a predetermined periodic signal.

20. A time domain equalizer according to claim 19, wherein said channel impulse estimator constructs a matrix H of said channel impulse response from variances in said received periodic signal.

21. A time domain equalizer according to claim 18, wherein said out of band noise power spectral density estimator receives a signal with a known power spectral density.

22. A time domain equalizer according to claim 21, wherein said out of band noise power spectral density estimator constructs an autocorrelation matrix from variances in said received power spectral density.

23. A time domain equalizer according to claim 18, wherein said calculating means include means to perform a minimum mean square error analysis.

24. A time domain equalizer according to claim 18, wherein said calculating means employs a unit tap constraint to determine said target impulse response.

25. A time domain equalizer according to claim 18, wherein said calculating means employs a unit energy constraint to determine said target impulse response.

* * * * *